United States Patent [19]

Seifert

[11] Patent Number: 4,720,134

[45] Date of Patent: Jan. 19, 1988

[54] CONVERTIBLE TOP FOR VEHICLES, ESPECIALLY FOR PASSENGER MOTOR VEHICLES

[75] Inventor: Peter R. Seifert, Weil der Stadt 5, Fed. Rep. of Germany

[73] Assignee: Daimler-Benz Aktiengesellshaft, Stuttgart, Fed. Rep. of Germany

[21] Appl. No.: 879,630

[22] Filed: Jun. 27, 1986

[30] Foreign Application Priority Data

Jun. 29, 1985 [DE] Fed. Rep. of Germany ....... 3523433

[51] Int. Cl.$^4$ .............................................. B60J 7/12
[52] U.S. Cl. ................................ 296/118; 296/120 R; 296/122; 296/116
[58] Field of Search ............... 296/107, 109, 111, 116, 296/118, 121, 122, 120 R

[56] References Cited

U.S. PATENT DOCUMENTS 3,075,804 1/1963 Geiger et al. ....................... 296/107
3,460,865 8/1969 Podwys ............................... 296/117

FOREIGN PATENT DOCUMENTS 1212423 9/1966 Fed. Rep. of Germany .
592176 9/1947 United Kingdom ............ 296/120 R Primary Examiner—Dennis H. Pedder Attorney, Agent, or Firm—Barnes & Thornburg

[57] ABSTRACT

A convertible top for vehicles with a frame and a textile cover, in which two columns stretching the cover material are pivotal about an axis extending transversely to the vehicle and with a closed convertible top have a maximum distance from one another at the height of the upper edges of the side walls of an associated body; this maximum distance is adapted to be automatically reduced in the course of the folding-in operation by means of spring-loaded adjusting mechanisms as a function of the pivot angle of the columns stretching the cover material. In order to enable a folding-in of the convertible top into a top box of a vehicle rear section tapered for aerodynamic reasons, the columns supporting the fabric material of the textile cover are each formed by a roof column and a fabric-retaining bow-shaped member of which the roof column extends offset toward the inside and the fabric-retaining bow-shaped member is arranged on the outside of the roof column, and the fabric-retaining bow-shaped member which is pivotally connected in the upper area of the roof column, is adapted to be pivoted from an outwardly pivoted stretching position in which, with a closed top, it predetermines the lateral inclination of the textile cover, into a pivoted-in folding position in which it extends essentially parallel to the roof column.

12 Claims, 5 Drawing Figures

CONVERTIBLE TOP FOR VEHICLES, ESPECIALLY FOR PASSENGER MOTOR VEHICLES

The present invention relates to a convertible top for vehicles, especially for motor vehicles, with a frame and a fabric covering, in which two columns stretching the cover material are pivotal about an axis extending transversely to the vehicle and with a closed convertible top have a maximum spacing from one another at the height of the upper edges of side walls of an associated body, and in which this maximum spacing is adapted to be automatically reduced in the course of the folding-in operation by means of adjusting mechanisms in dependence on the pivot angle of the columns stretching the cover material.

Such a type of foldable convertible top is disclosed already in the DE-PS 12 12 423, whereby the spacing reduction takes place in that the main columns run up on abutment wedges arranged on the inside of the side walls. However, in this patent, the main columns again rebound in the course of the folding operation after passing the running-up wedges and thus again assume the maximum spacing.

Therebeyond the spacing reduction is realized by an elastic deformation of the main columns so that the possible spacing reduction can amount to only small values.

On the one hand, this is due to the fact that a further deformation and, in particular, its maintenance over the entire opening operation of the foldable convertible top is possible only with a relatively labile top linkage, and, on the other hand, this is due to the fact that larger spring deflection travels of the roof columns lead to stresses in the joints of the foldable convertible top.

For motor vehicles which are provided with a drawn-in rear section configuration for aerodynamic reasons, and whose foldable top is to be lowerable into a top box of the rear section on the body side, the spacing reduction which can be realized without problems by spring deflection of the columns stretching the cover material of the known convertible tops is not adequate.

The present invention is therefore concerned with the task to further develop a foldable convertible top of the type described above so that a larger spacing reduction is made possible between the columns of the convertible top stretching the cover material, which permits without problems a folding-in of the convertible top into a top box of a tapered vehicle rear section.

The underlying problems are solved according to the present invention in that the columns supporting the fabric of the textile cover are formed each by a roof column (main brace or support) and by a fabric-retaining bow-shaped member, of which the roof column extends offset inwardly and the fabric-retaining bow-shaped member is arranged on the outside of the roof column, in that the fabric-retaining bow-shaped member is pivotally connected in the upper area of the roof column, and in that the fabric-retaining bow-shaped member is adapted to be pivoted from an outwardly pivoted stretching position in which it predetermines the lateral inclination of the textile fabric with closed convertible top, into a pivoted-in folding position in which it extends parallel or nearly parallel to the roof column.

These and other objects, features and advantages of the present invention will become more apparent from the following description when taken in connection with the accompanying drawing which shows, for purposes of illustration only, one embodiment in accordance with the present invention, and wherein.

Figure 1:
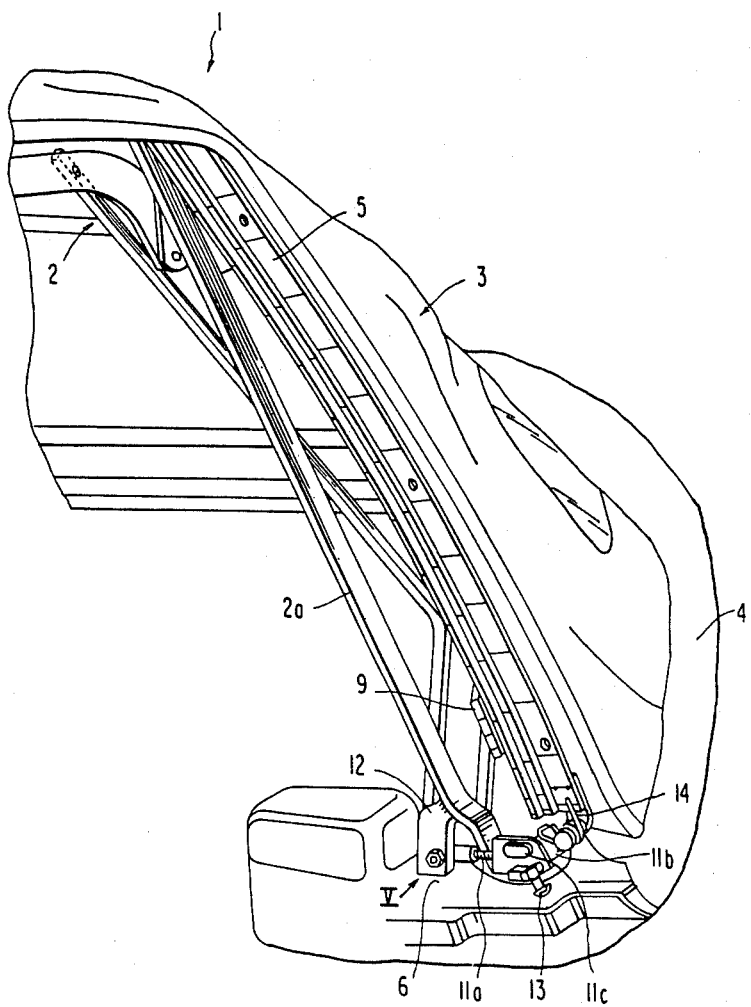
FIG. 1 is a front elevational view of a left section of a convertible top in accordance with the present invention in a closing position.
Figure 4:
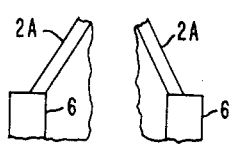
FIG. 4 is a schematic view depicting the angle or inclination of the roof columns when the convertible top of FIG. 1 is in its closed position.
Figure 2:
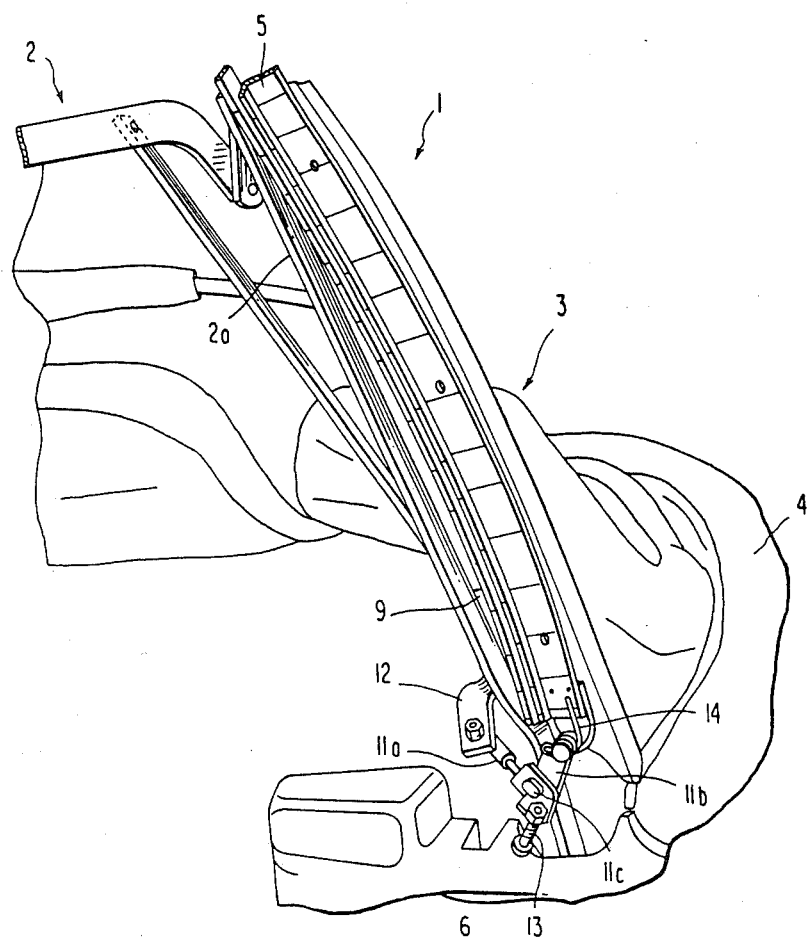
FIG. 2 is a front elevational view, similar to FIG. 1, after a first phase of the folding-in operation.
Figure 3:
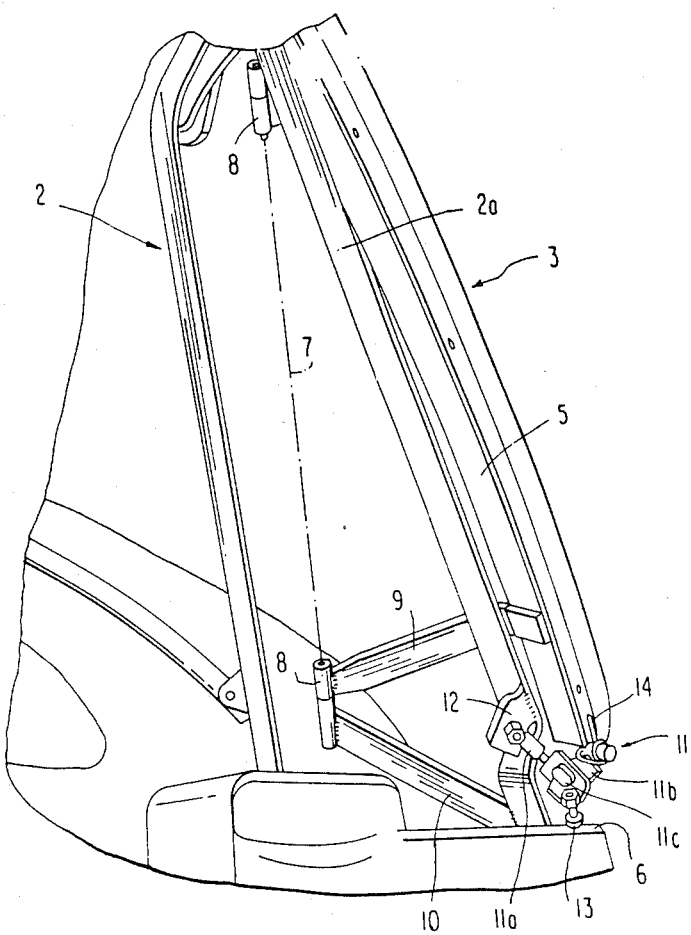
FIG. 3 is a perspective interior view of the left section of the foldable top in accordance with the present invention.

Referring now to the drawing wherein like reference numerals are used throughout the various views to designate like parts, a foldable convertible top generally designated by reference numeral 1 includes, in a manner known as such, a roof linkage generally designated by reference numeral 2 and a fabric cover generally designated by reference numeral 3. The convertible top 1 is coordinated to a motor vehicle (not shown) having a so-called drawn-in rear section, whereby it is adapted to be transferred from the illustrated closing position into a folded-in position lowered into a top box and vice versa. The folding-in operation thereby takes place by pivoting down a main support 2a which is pivotal about an axis extending in the vehicle transverse direction. The remaining linkage elements of the roof linkage 2 are kinematically controlled in a known manner in dependence on the pivot angle of the main support 2a. The roof columns of the main support 2a are provided with an offset within the exit area out of the body 4 so that the extend offset toward the vehicle interior space. FIG. 4 schematically depicts the inclination of roof column 2A when the convertible top is in a closed position. For maintaining the outer contour, a separate fabric-retaining bow-shaped member 5 each is arranged approximately in alignment with the roof columns of the main support, which follows the lateral inclination of the foldable top 1. The fabric-retaining bow-shaped member 5 has an essentially L-shaped cross section and, with the outer surface thereof, adjoins flush a rear window edge of a side window (not shown). In order to shorten the distance of the cover-retaining bow-shaped members 5 at the height of the upper edges of the side wall, in this case of the box column cover plate 6, from the position of maximum distance according to FIG. 1, in which the cover-retaining bow-shaped members 5 hold the textile cover 3 tautly stretched, in such a manner that the foldable roof 1 can be lowered into an associated cover box, the cover-retaining bow-shaped members 5 are pivotal from the outwardly deflected stretching position into a pivoted-in folding position visible in FIG. 2, in which they extend essentially axially parallel to the roof columns of the main support 2a. For that purpose, both cover-retaining bow-shaped members 5 are supported about a pivot axis 7 (FIGS. 3) extending parallel to the lateral inclination of the foldable top 1 by means of two hinge joints 8 which are arranged fixedly with respect to the roof columns of the main support 2a. In the upper area of the roof columns of the main support 2a, the cover-retaining bow-shaped member 5 is fastened directly by means of the hinge joint 8 whereas in the lower section the cover-retaining bow-shaped member 5 is guided at an outrigger arm 9 which is rigidly connected with the fabric-retaining bow 5. The fixed pivot axis 7 is assured in the lower area by a bracket 10 which projects from the main support 2a. In the alternative, it is also possible to support the fabric-retaining bow-shaped members 5 at their upper end on the roof columns of the main support 2a about an axis extending in the vehicle longitudinal direction. This, however, would entail the disadvantage that considerable proportions of the stretching forces for the textile cover 3 would have to be absorbed by the adjusting mechanism which, in contrast, can be absorbed in the illustrated embodiment by the outrigger arms 9.

Figure 5:
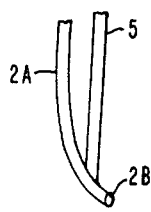
FIG. 5 is a schematic view taken in the direction V of FIG. 1 and showing the relative position of certain parts.

A toggle or knee lever generally designated by reference numeral 11 is provided as adjusting mechanism dependent on the pivot angle, whose one lever 11a is pivotally connected at the associated roof column of the main support 2a by means of a lug 12 and whose second lever 11b is pivotally connected at the fabric-retaining bow-shaped member 5. During the closing operation of the foldable top 1, the knee lever 11 whose knee joint 11c is supported on the box column cover plate 6 by means of an adjusting screw 13, is transferred against the prestress of a leg spring 14 approximately into a straightened position whereby the bow-shaped member 5 is pivoted into its outer dead-center position. If the support of the knee joint 11c is terminated the foldable top 1 pivots back, then the toggle or knee lever 11 snaps back into a pivoted-in folding position under the spring force of the leg spring 14 whereby the fabric-retaining bow-shaped member 5 is taken along until it abuts with its lower end at the roof column of the main support 2a. The knee lever 11 remains in this pivoted-in folding position until it is again brought into its straightened position during the closing operation of the foldable top 1. However, it is a prerequisite for this type of control of the bow-shaped member 5 in dependence on the pivot angle that the movement course of the main support 2a permits a lifting-off of the knee lever 11. For that reason, the pivot axis 2B (FIG. 5) of the main support 2a extending transversely to the vehicle must be offset toward the rear with respect to the longitudinal alignment of the fabric-retaining bow-shaped member 5 with a closed convertible top 1. A lifting of the lower end of the bow-shaped member 5, respectively, of the lug 12 relative to the box column cover plate 6 thus results in the course of the opening movement of the convertible top 1, whereby the amount of the offset must be so dimensioned such that a sufficient free movement for the knee lever 11 results. As the knee lever 11 must also be capable, in addition to its straightening and folding movement, to deflect corresponding to the angular pivot path of the outrigger arm 9, the bearing between lug 12 and lever 11a is constructed as ball joint bearing.

While I have shown and described only one embodiment in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A convertible top for vehicles of the type having flexible cover means and a frame means for supporting the cover means, the frame means comprising, two column means for stretching the cover means when in a closed convertible top position, said column means being spaced from one another in a transverse direction of a vehicle and being mounted for pivotal movement about a transverse vehicle axis with the column means having a maximum distance from one another with a closed convertible top substantially at the height of upper edges of side walls of an associated vehicle body, column adjusting means for automatically adjusting a maximum width of the convertible top at the column means so that said width is reduced in the course of the convertible top folding-in operation in dependence on a pivot angle of the column means, said column means being each formed by a roof column constituting a main support and by a fabric-retaining bow-shaped member, the roof columns extending offset toward the vehicle inside and the bow-shaped member being arranged on the outside of a respective roof column, the bow-shaped member being pivotally connected to a corresponding roof column in the upper area thereof, and said column adjusting means including further adjusting means for controlling the movement of the bow-shaped member so that it is pivotal from an outwardly deflected stretching position in which it predetermines a lateral inclination of the cover means with a closed top, into a pivoted-in folding position in which it extends at least approximately parallel to the roof column.

2. A convertible top according to claim 1, wherein the pivot axis of the roof columns is offset toward the rear with respect to the longitudinal alignment of the bow-shaped member when the convertible top is closed.

3. A convertible top according to claim 2, wherein the further adjusting means includes a knee lever means at each vehicle side, respective first levers of said knee lever means being pivotally connected at the bow-shaped member and respective second levers being pivotally connected at the associated roof column, the knee lever means being automatically transferable during the closing operation of the convertible top approximately into a stretched position with support of the respective knee joints of the knee lever means at a respective fixed abutment, said first levers being respectively spring-loaded by a spring means in such a manner that during the pivoting back of the convertible top the knee lever means are held in a pivoted-in folding position after termination of the support of the knee joint.

4. A convertible top according to claim 3, wherein the fixed abutment is formed by a box column cover plate of the associated vehicle.

5. A convertible top according to claim 3, wherein the spring means is a leg spring.

6. A convertible top according to claim 3, wherein said bow-shaped member is pivotally connected at each vehicle side directly in an upper area of the associated roof column and at an outrigger arm in the lower area of the bow-shaped member by means of two hinge joints, both hinge joints being arranged fixedly with respect to the roof column, and one of the pivotal connections of the knee lever means being constructed as joint bearing means.

7. A convertible top according to claim 6, wherein the joint bearing means is a ball joint.

8. A convertible top according to claim 1, wherein the further adjusting means includes a knee lever means at each vehicle side, respective first levers of said knee lever means being pivotally connected at the bow-shaped member and respective second levers being pivotally connected at the associated roof column, the knee lever means being automatically transferable during the closing operation of the convertible top approximately into a stretched position with support of the respective knee joints of the knee lever means at a respective fixed abutment, said first levers being respectively spring-loaded by a spring means in such a manner that during the pivoting back of the convertible top the knee lever means are held in a pivoted-in folding position after termination of the support of the knee joint.

9. A convertible top according to claim 8, wherein the spring means is a leg spring.

10. A convertible top according to claim 8, wherein said bow-shaped member is pivotally connected directly in the upper area of the roof column and at an outrigger arm in the lower area of the bow-shaped member by means of two hinge joints, both hinge joints being arranged fixedly with respect to the roof column, and one of the pivotal connections of the knee lever means being constructed as joint bearing means.

11. A convertible top according to claim 1, wherein said bow-shaped member is pivotally connected directly in the upper area of the roof column and at an outrigger arm in the lower area of the bow-shaped member by means of two hinge joints, both hinge joints being arranged fixedly with respect to the roof column.

12. The convertible top according to claim 8, wherein the fixed abutment is formed by a box column cover plate.

* * * * *